(12) United States Patent
Goldman

(10) Patent No.: US 12,126,294 B2
(45) Date of Patent: Oct. 22, 2024

(54) POST MEASUREMENT CALIBRATING TRANSLATION CIRCUIT

(71) Applicant: Alpha and Omega Semiconductor International LP, Toronto (CA)

(72) Inventor: Steven J. Goldman, Cary, NC (US)

(73) Assignee: Alpha and Omega Semiconductor International LP, Toaronto (CA)

( * ) Notice: Subject to any disclaimer, the term of this patent is extended or adjusted under 35 U.S.C. 154(b) by 71 days.

(21) Appl. No.: 18/059,887

(22) Filed: Nov. 29, 2022

(65) Prior Publication Data

US 2024/0178785 A1     May 30, 2024

(51) Int. Cl.
    *H02P 29/68*      (2016.01)
    *G01K 15/00*      (2006.01)

(52) U.S. Cl.
    CPC ............ *H02P 29/68* (2016.02); *G01K 15/005* (2013.01)

(58) Field of Classification Search
    CPC ....... G01K 15/005; H02P 29/68; H02P 29/64; H02P 1/24; H02P 1/26; H02P 1/42; H02P 1/46; H02P 1/465; H02P 6/00; H02P 6/005; H02P 6/08; H02P 29/60; H02P 6/12; H02P 6/28; H02P 6/32; H02P 21/00; H02P 23/07; H02P 25/022; H02P 25/062; H02P 25/064; H02P 25/092; H02P 25/107; H02P 27/06;

(Continued)

(56) References Cited

U.S. PATENT DOCUMENTS

| | | | |
|---|---|---|---|
| 8,907,653 B2 | 12/2014 | Lee | |
| 2006/0179895 A1* | 8/2006 | Thorn | G01K 15/00 374/E7.042 |
| 2010/0117715 A1 | 5/2010 | Ariyama | |

FOREIGN PATENT DOCUMENTS

| | | |
|---|---|---|
| CN | 201583956 U | 9/2010 |
| CN | 201910769 U | 7/2011 |

(Continued)

OTHER PUBLICATIONS

Carter, B., Designing Gain and Offset in Thirty Seconds, Texas Instruments, Feb. 2002, 15 pages.

(Continued)

*Primary Examiner* — Antony M Paul
(74) *Attorney, Agent, or Firm* — Thompson Patent Law Offices PC

(57) ABSTRACT

Apparatus and associated methods relate to a post temperature calibration translation circuit (PTCTC) configured to generate a signal corresponding to a predetermined temperature voltage translation relationship (TVTR). In an illustrative example, the PTCTC may be coupled to a motor controller including a control logic to regulate a power input to a motor based on the TVTR. The PTCTC further includes an input port configured to receive a temperature sensor output based on a predetermined transfer function. At least one analog corrective translation circuit (ACTC), for example, may generate temperature input signals to the motor power controller based on the temperature sensor output. The temperature input signals are generated based on a calibrated transfer function such that the temperature input signals substantially match an output according to the TVTR. Various embodiments may advantageously avoid modification of the control logic when the predetermined transfer function is altered.

20 Claims, 14 Drawing Sheets

(58) Field of Classification Search
CPC ..... H02P 27/08; H05B 41/2828; G01R 19/02; G01R 21/14; H02K 11/33
See application file for complete search history.

(56) References Cited

FOREIGN PATENT DOCUMENTS

| WO | 2021009956 A1 | 1/2021 |
|----|---------------|--------|
| WO | 2021132084 A1 | 7/2021 |

OTHER PUBLICATIONS

Harvey, D., 3.4: Mathematical Operations Using Operational Amplifiers, Chemistry LibreTexts, 3 pages.
Kuhn, K, Circuits for Controlling Slope and Offset, Mar. 13, 2011, 7 pages.
Maxim Integrated, The ABCs of Analog to Digital Converters: How ADC Errors Affect System Performance, 2022, 5 pages.
Renesas, Operational Amplifiers How to Bias Op-Amps Correctly, Dec. 13, 2019, 11 pages.

* cited by examiner

POST MEASUREMENT CALIBRATING TRANSLATION CIRCUIT

TECHNICAL FIELD

Various embodiments relate generally to communication circuits.

BACKGROUND

Electrical power may, for example, be used to provide power to one or more types of loads. For example, electrical power may be provided to loads such as motors and/or other actuators. Various systems may use motors such as, by way of example and not limitation, industrial, medical, and residential systems. For example, home appliances, such as washing machines and dishwashers, may include an electric motor.

In some examples, the electric motor may be controlled by a motor controller. For example, a motor may be connected to a motor controller unit (MCU) that may include one or more operation modules to control and/or regulate the electric motor. For example, the MCU may control the electric motor based on predetermined rules embedded/programmed in the MCU (e.g., in a memory, an electrically erasable programmable read-only memory (EEPROM), or other memory modules). In some examples, the MCU may include operation modules to start, to stop, and/or to regulate a power performance including a speed, and a torque output of the motor. In some examples, the MCU may include operation modules to protect against overloads and electrical faults.

Some MCUs may include an intelligent power module (IPM). For example, the IPM may include power electronics (e.g., Insulated-gate bipolar transistor (IGBT), Trench Field Stop (TFS) IGBT, power metal-oxide-semiconductor field-effect transistor (MOSFET)) to regulate a speed and a direction of the electric motor. For example, the IPM may include switching drives to power brushless motors. In some examples, the IPM may also include integrated circuits (ICs). For example, the IPM may include sensors, such as thermistors and motion sensors.

SUMMARY

Apparatus and associated methods relate to a post temperature calibration translation circuit (PTCTC) configured to generate a signal corresponding to a predetermined temperature voltage translation relationship (TVTR). In an illustrative example, the PTCTC may be coupled to a motor controller including a control logic to regulate a power input to a motor based on the TVTR. The PTCTC further includes an input port configured to receive a temperature sensor output based on a predetermined transfer function. At least one analog corrective translation circuit (ACTC), for example, may generate temperature input signals to the motor power controller based on the temperature sensor output. The temperature input signals are generated based on a calibrated transfer function such that the temperature input signals substantially match an output according to the TVTR. Various embodiments may advantageously avoid modification of the control logic when the predetermined transfer function is altered.

Various embodiments may achieve one or more advantages. For example, some embodiments may advantageously include analog components only to generate a continuous corrective transfer function. For example, some embodiments may include non-linear ACTC to advantageously generate a non-linear calibration transfer function. Some embodiments may, for example, include a predetermined temperature range of interest to advantageously simplify a process to generate a combination of the ACTCs.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a dynamic thermal translating system (DTTS) is introduced with reference to FIGS. 1A-1B. Second, that introduction leads into a description with reference to FIGS. 2-6 of some exemplary embodiments of post temperature calibration translation circuit (PTCTC) used in a DTTS. Third, with reference to FIGS. 7-8, this document describes exemplary apparatus and methods useful for developing and verifying an exemplary PTCTC using one or more analog corrective transfer circuits. Finally, the document discusses further embodiments, exemplary applications and aspects relating to apparatus and methods for post temperature calibration translation circuits.

Figure 1A:
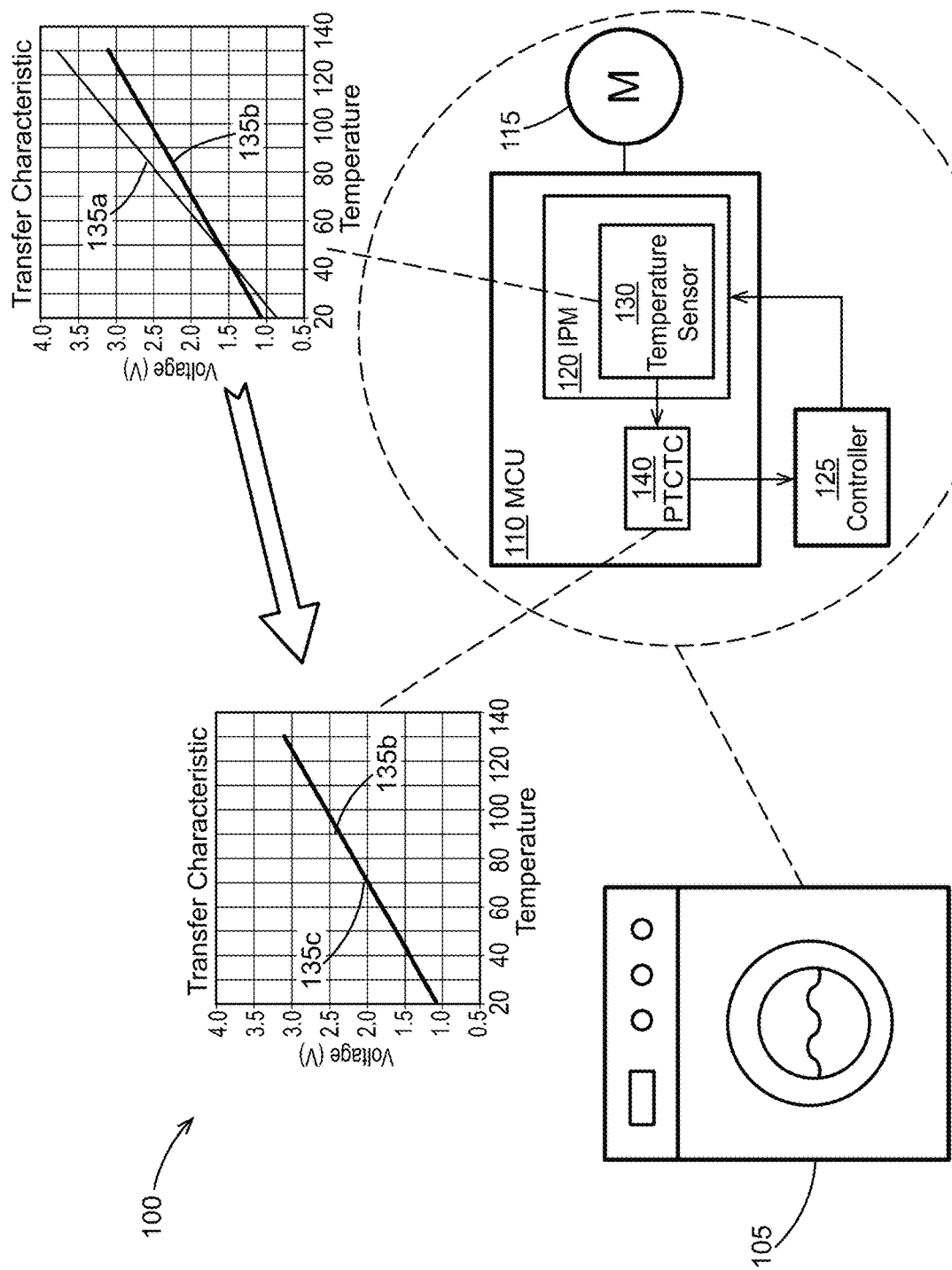
FIG. 1A depicts an exemplary dynamic thermal translating system (DTTS) including an exemplary motor control unit (MCU) provided with an exemplary post temperature calibration translation circuit (PTCTC), employed in an illustrative use-case scenario.

FIG. 1A depicts an exemplary dynamic thermal translating system (DTTS 100) employed in an illustrative use-case scenario. In this example, the DTTS 100 includes a home appliance 105. As shown, the home appliance 105 may be a washing machine. In some examples, the home appliance 105 may be a dishwasher. In some examples, the home appliance 105 may be other home appliances that utilize an actuator (e.g., a motor). For example, the home appliance 105 may include other motorized industrial equipment.

The home appliance 105 includes a motor control unit (MCU 110) connected to a motor 115. For example, the motor 115 may be an electric motor. For example, the motor 115 may be an alternate current (AC) motor. For example, the motor 115 may be a direct current (DC) motor. For example, the motor 115 may be a pulse modulated motor (e.g., a brushless DC motor, a switched reluctance motor). As shown, the motor 115 is operably coupled to the MCU 110. For example, the MCU 110 may regulate a power supplied to the motor 115.

In this example, the MCU 110 includes an intelligent power module (IPM 120). For example, the IPM 120 may include a drive circuit to supply power to the motor 115. In some implementations, the IPM 120 may be configured to supply power to other actuator loads in place of the motor 115. For example, the IPM may supply power to a servo motor.

The IPM 120 receives, in this example, an input from a controller 125. For example, the controller 125 may be a microcontroller of the home appliance 105. In some implementations, the controller 125 may include a processor to execute one or more software modules. For example, the software modules may include functions to regulate operations and performance of the motor 115 using the IPM 120. In some implementations, the controller 125 may include safety or protection software modules. For example, the controller 125 may control the IPM 120 based on a temperature of the IPM 120. For example, when the IPM 120 is overheated, the controller 125 may control the IPM 120 to reduce power supply to the motor 115 to, for example, protect the IPM 120 from overheating.

In this example, the IPM 120 includes a temperature sensor 130. The temperature sensor 130 may, for example, be a thermistor. In some implementations, the temperature sensor 130 may generate an output signal (e.g., an output voltage) based on an output transfer function to translate measured temperatures to corresponding voltages. As an illustrative example, the predetermined transfer function of the temperature sensor 130 may be displayed as a first transfer function 135a.

In various implementations, the controller 125 may be configured and/or calibrated to control the IPM 120 based on a predetermined temperature-voltage translation relationship (TVTR) as shown in a second transfer function 135b. As shown, the MCU 110 includes a post temperature calibration translation circuit (PTCTC 140). For example, the PTCTC 140 may calibrate the output signals of the temperature sensor 130 into a calibrated transfer function 135c. As shown in this example, the calibrated transfer function 135c may be substantially matching to the TVCR as represented by the second transfer function 135b. For example, the TVCR may be represented by a linear transfer function based on two data points of the TVCR. For example, the TVCR may be represented by a non-linear transfer function (e.g., a polynomial function).

In some implementations, using the PTCTC 140, software and logic of the controller 125 are kept unchanged when the output transfer function of the temperature sensor 130 does not match the predetermined TVTR. Accordingly, development costs for modifying and adopting hardware into the DTTS 100 may be advantageously reduced.

Figure 1B:
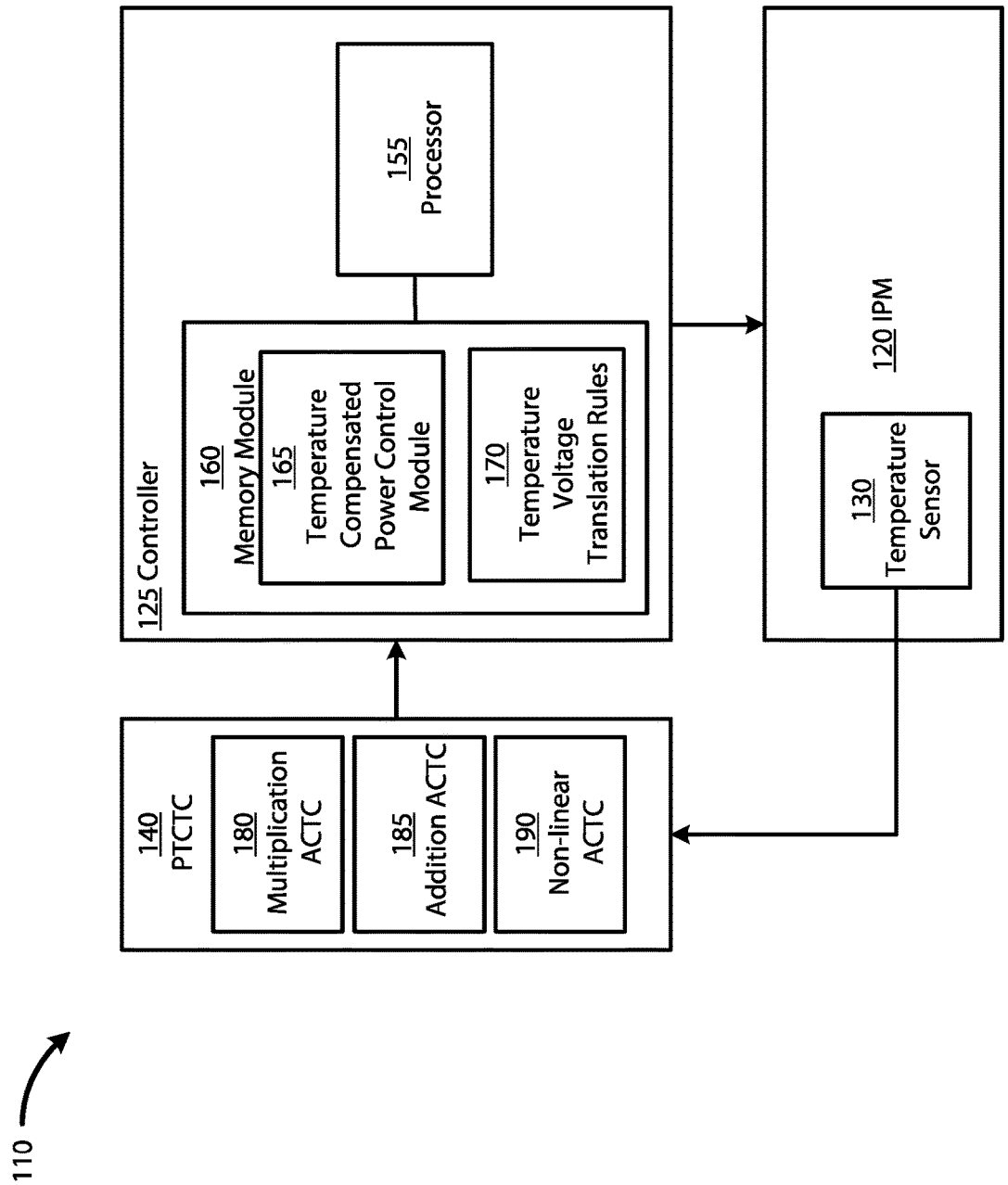
FIG. 1B is a block diagram depicting an exemplary MCU including an exemplary PTCTC.

FIG. 1B is a block diagram depicting an exemplary motor control unit (MCU 110) including an exemplary Post Temperature Calibration Translation Circuit (PTCTC 140). As shown, the controller 125 includes a processor 155 and a memory module 160. The processor 155 may, for example, include one or more processing units. The processor 155 is operably coupled to a memory module 160. The memory module 160 may, for example, include one or more memory modules (e.g., random-access memory (RAM)). For example, the processor 155 may execute software modules stored in the memory module 160.

The memory module 160 includes a temperature compensated power control module (TCPCM 165). For example, the TCPCM 165 may include a control logic to regulate the IPM 120 based on a temperature of the IPM 120. In this example, the TCPCM 165 uses temperature voltage translation rules 170 to convert a received signal from a temperature sensor into temperature. For example, the temperature voltage translation rules 170 may be a lookup table. For example, the temperature voltage translation rules 170 may be a software code (e.g., a global function) configured to convert a signal (e.g., a voltage level) into temperature value (e.g., in Celsius or in Fahrenheit). For example, the software code may be implementing one or more mathematical operations. For example, the second transfer function 135b may be a mathematical model approximating the transfer function according to the temperature voltage translation rules 170. Based on the temperature value, for example, the TCPCM 165 may determine whether the IPM 120 is overheated.

As shown, the temperature sensor 130 of the IPM 120 is operably coupled to the PTCTC 140. For example, the temperature sensor 130 may translate a temperature in the IPM 120 into a voltage level based on the first transfer function 135a. The PTCTC 140 includes one or more analog corrective transfer circuits (ACTCs) circuits in this example. The ACTCs may be implemented using analog devices. For example, the ACTCs may include transistors. For example, the ACTCs may include resistors. For example, the ACTCs may include inductors. For example, the ACTCs may include capacitors.

In various implementations, the ACTCs may be configured to apply a corrective transfer factor (CTF) to an input function. For example, the CTF may include a mathematical model (e.g., a linear model, a non-linear model) configured to translate an input to an output according to the CTF. In this example, a multiplication ACTC 180 may multiply a signal received from the temperature sensor 130. For example, the multiplication ACTC 180 may alternate a slope of the first transfer function 135a. An offset ACTC 185 may offset the signal received from the temperature sensor 130. For example, the offset ACTC 185 may offset an y-intercept the first transfer function 135a. A non-linear ACTC 190 may perform a non-linear polynomial calculation as a function of the received signal from the temperature sensor 130. For example, the non-linear ACTC 190 may generate a non-linear response. In some implementations, other ACTCs (e.g., a differentiation ACTC, an integration ACTC) may also be used.

In various implementations, the PTCTC 140 may include the ACTCs combined in parallel and/or series arrangement to collectively translate the first transfer function 135a into a calibrated transfer function (e.g., the calibrated transfer function 135c). For example, the calibrated transfer function may include, at least within a predetermined temperature range of interest, a temperature-voltage response close to the temperature voltage translation rules 170. For example, the PTCTC 140 may advantageously generate, using the ACTCs 180, 185, 190, a calibrated voltage representing the temperature measured by the temperature sensor 130 in real time. For example, at the measured temperature, a difference between the calibrated voltage and a voltage generated from the temperature voltage translation rules 170 may be within a predetermined margin and/or error.

In various implementations, using ACTCs 180, 185, 190, the PTCTC 140 may provide advantageously a continuous and linear time-invariant response. For example, unlike using a lookup table where translation points are discrete, the PTCTC 140 may translate the received signal from the temperature sensor 130 without smoothing and/or approximation between two data points. In some implementations, the PTCTC 140 may advantageously be more technically robust.

In some implementations, within a predetermined temperature range of interest, an error value corresponding to an aggregation of differences between an output of the calibrated transfer function 135c and the second transfer function 135b may be determined. For example, the error value may be less than a predetermined error threshold. For example, the error value may be computed based on a summation of a root mean square of the differences between the calibrated transfer function 135c and the second transfer function 135b within the predetermined temperature range of interest. For example, when the temperature sensor 130 is replaced with a second temperature sensor having different first transfer function 135a. The PTCTC may be adaptively configured using a new set of ACTC based on the second transfer function 135b and the modified second first transfer function 135a such that the temperature voltage translation rules 170 may be kept unchanged.

Figure 2A:
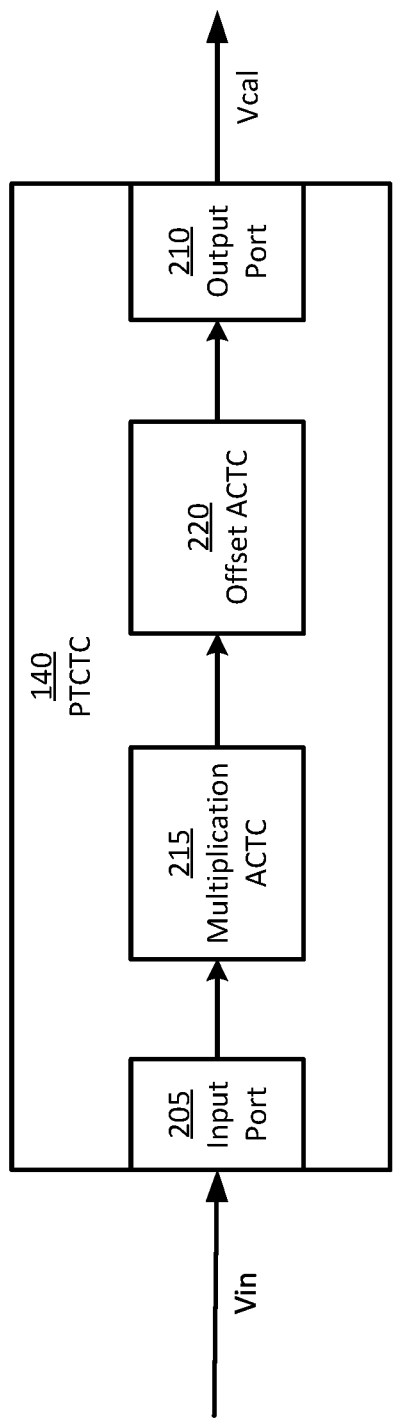
FIG. 2A is a block diagram showing an exemplary linear PTCTC to generate a calibrated function.

FIG. 2A is a block diagram showing an exemplary linear PTCTC 140 to generate a calibrated function. For example, the linear PTCTC 140 may be used when the CTF includes a linear model. As shown, the PTCTC 140 may receive, at an input port 205, an input voltage (Vin) from a temperature sensor (e.g., the temperature sensor 130). For example, Vin may correspond to a temperature measurement based on a first transfer function, such that Vin=$f_1$(T) and T is the temperature measured at the temperature sensor. The PTCTC 140 also includes an output port 210. For example, the output port 210 may be connected to a controller (e.g., the controller 125) that may include the TCPCM 165 to regulate the IPM 120 using a pre-existing TVTR (e.g., implemented by the temperature voltage translation rules 170).

In this example, the PTCTC 140 includes a multiplication ACTC 215 and an offset ACTC 220. For example, the multiplication ACTC 215 and the offset ACTC 220 may collectively match an approximate transfer function (e.g., the first transfer function 135a) of the pre-existing TVTR. For example, the approximate function may be a linear function. For example, the linear approximation may be determined within a predetermined temperature range of interest.

The multiplication ACTC 215, in some implementations, may scale the first transfer function by a first predetermined CTF. For example, the first predetermined CTF may be determined by matching a slope of the approximate function of the existing TVTR. The offset ACTC 220, in some implementations, may offset the scaled first transfer function (after being applied with the first predetermined CTF) by a second predetermined CTF (e.g., a voltage offset). For example, the second predetermined CTF may be determined by matching a y-intercept of the linear approximation of the pre-existing TVTR.

Accordingly, the PTCTC 140 may generate a calibrated transfer function to translate a temperature measurement into the calibrated function $f_{cal}$(T)=Vcal. In various examples, the calibrated function $f_{cal}$(T) may be substantially close to a pre-existing TVTR of the controller. For example, 'substantially close' may be determined based on a predetermined margin and/or error defined by a user (e.g., 1%, 5%, 10%, 20%). In some implementations, for example, 'substantially close' may be determined based on a statistical analysis (e.g., least mean squared between the predetermined TVTR and the calibrated transfer function). In some examples, 'substantially close' may be determined with reference (e.g., only) to a predetermined region of interest (e.g., temperature(s) of interest).

Figure 2B:
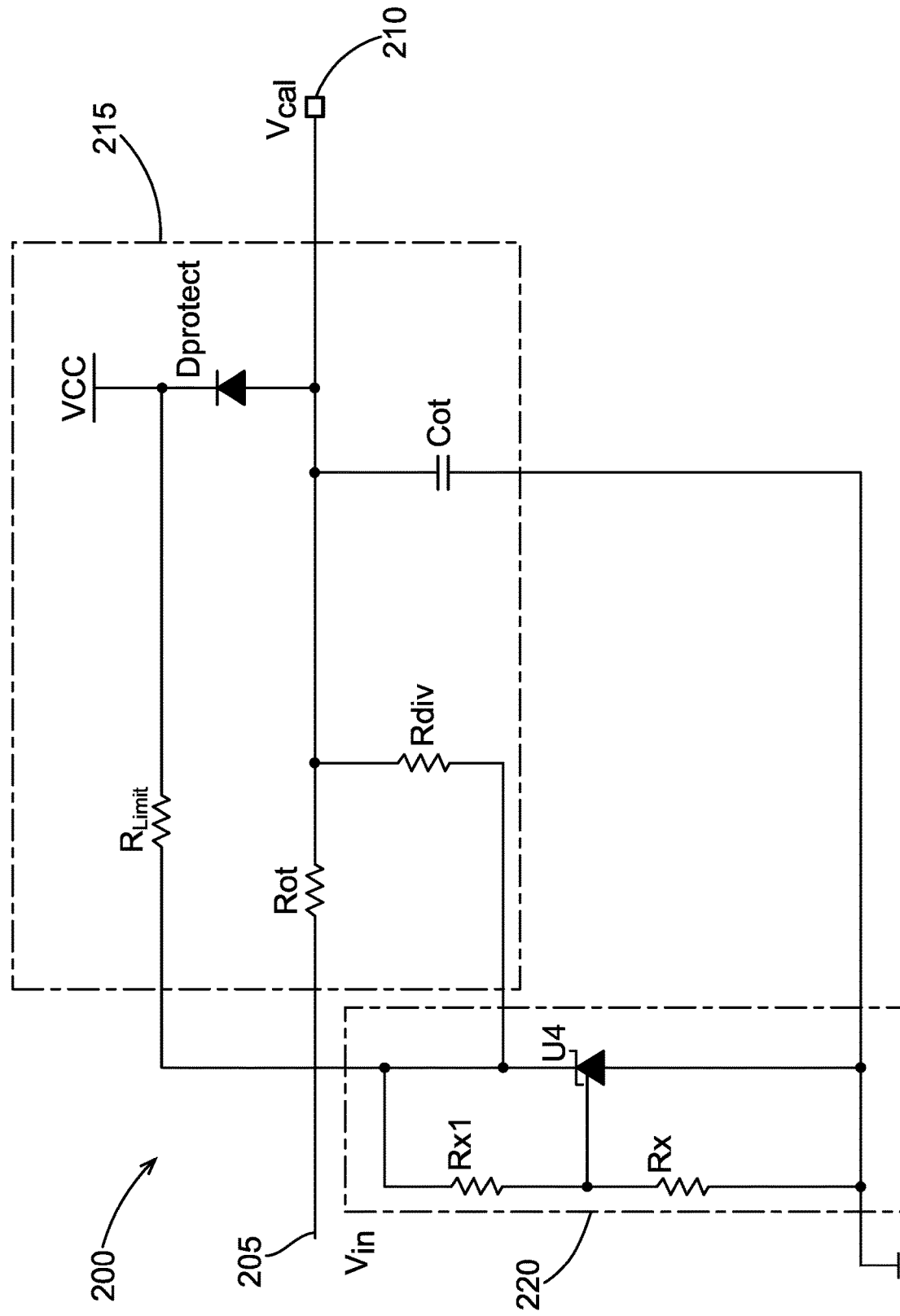
FIG. 2B depicts an exemplary electrical schematic of a PTCTC.

FIG. 2B depicts an exemplary electrical schematic of a PTCTC 200. For example, the PTCTC 200 may be one exemplary embodiment of the PTCTC 140 to translate an approximated transfer function (e.g., the first transfer function 135a) into a calibrated transfer function (e.g., the calibrated transfer function 135c).

As shown, the multiplication ACTC 215 may include a pair of resistors (Rot and Rdiv). For example, the pair of resistors may be configured to apply the first predetermined CTF to generate a target slope. The offset ACTC 220 includes two offset resistors (Rx and Rx1) and a voltage regulator (U1) in this example. For example, the Rx and Rx1 may be configured as a voltage divider circuit. For example, the offset ACTC 220 may be configured to apply the second predetermined CTF to generate a target offset. In various implementations, the resistance values of the multiplication ACTC 215 and the offset ACTC 220 may be determined by numeric simulations to apply corresponding CTFs.

Figure 2C:
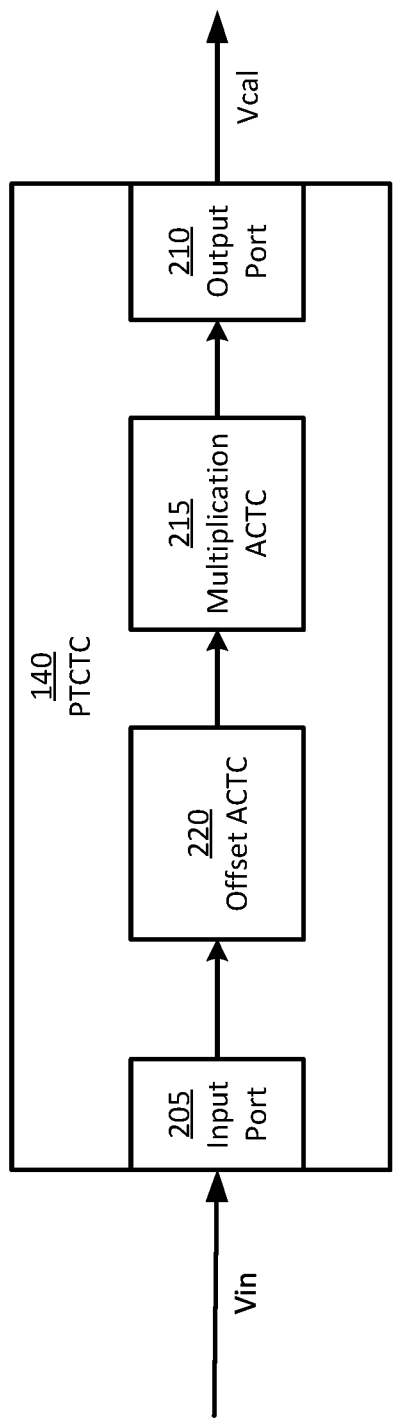
FIG. 2C shows an exemplary embodiment PTCTC implementing the calibrated function as described with reference to FIG. 2A.

FIG. 2C shows an exemplary embodiment PTCTC implementing the calibrated function as described with reference to FIG. 2A. In this example, the second predetermined CTF is first applied to the Vin by the offset ACTC 220. Then, the first predetermined CTF is applied to the offset Vin to translate a slope of the first transfer function. In various implementations, different topology of the PTCTC 140 may advantageously save space to implement the PTCTC 140.

Figure 3:
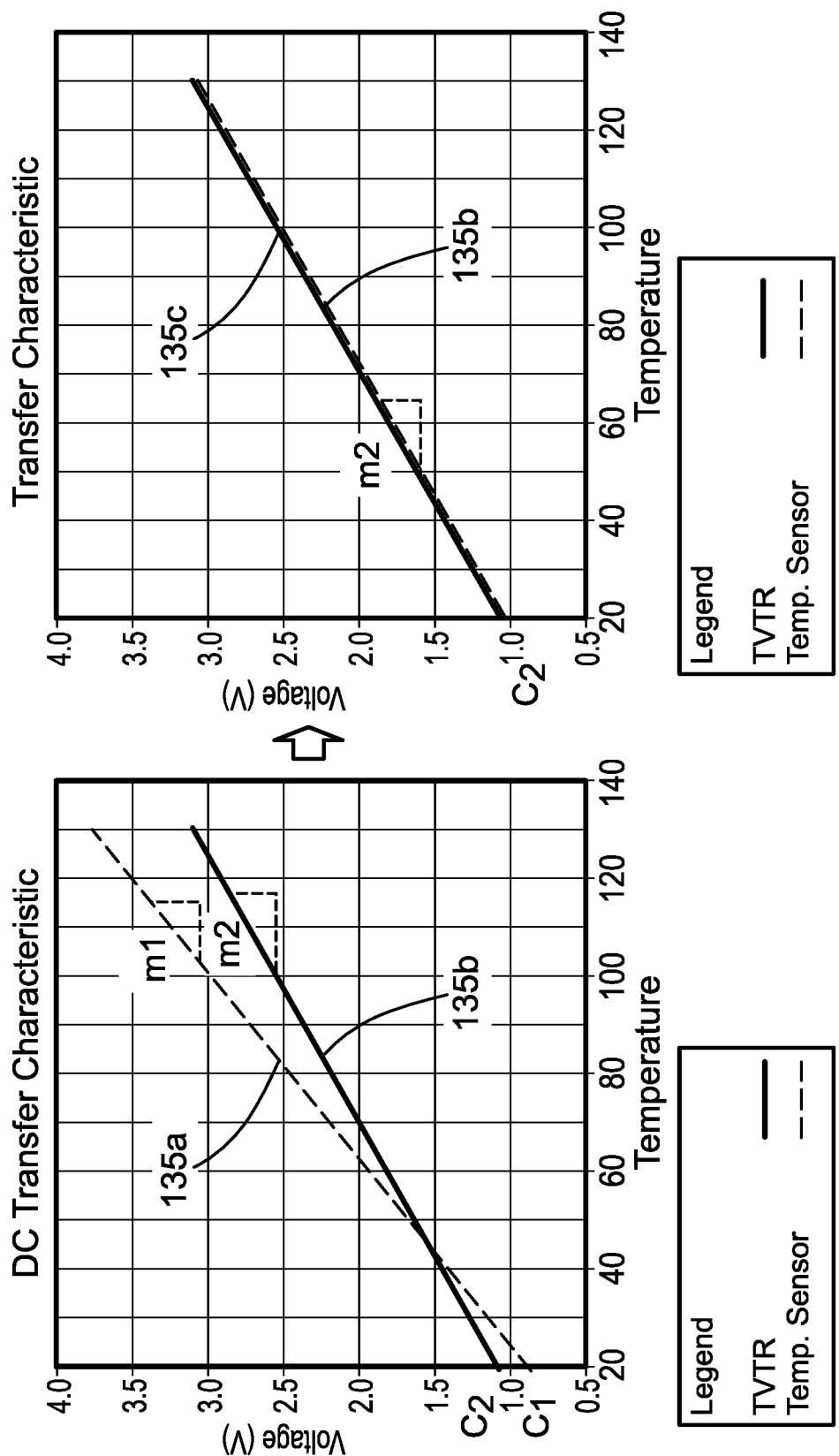
FIG. 3 depicts exemplary transfer responses of a voltage sensor and the voltage sensor coupled to the PTCTC described with reference to FIG. 2.

FIG. 3 depicts exemplary transfer responses of a voltage sensor and the voltage sensor coupled to the PTCTC 200 described with reference to FIG. 2. As shown, the temperature sensor 130 may generate a voltage corresponding to a temperature based on the first transfer function 135a. The TCPCM 165 may include control logic to regulate the IPM 120 based on a TVTR represented by the second transfer function 135b. For example, the second transfer function 135b may be an (linear) approximation of the TVCR. As an illustrative example, the first transfer function 135a includes a slope $m_1$ and a y-intercept $c_1$. The second transfer function 135b includes a slope $m_2$ and a y-intercept $c_2$. As shown, $m_1 \neq m_2$ and $c_1 \neq C_2$.

In some implementations, the PTCTC 200 may generate the calibrated function $f_{cal}$(T) that may match substantially to the TVTR represented by the second transfer function 135b as shown on the right side of FIG. 3. For example, the calibrated function 135c may include the slope $m_2$ and the y-intercept $c_2$.

In some implementations, to determine resistance values in the multiplication ACTC 215, a slope ratio between the second transfer function 135b and the first transfer function 135a may be determined. For example, the slope ratio may be r=m$_2$/m$_1$=0.7. In some implementations, the resistance ratio of Rdiv and Rot may be determined by $$\frac{m_2}{m_1} = \frac{Rot}{(Rdiv + Rot)}.$$

As an illustrative example without limitation, if Rot=10 kΩ and the r=0.7, then Rdiv=23.3 kΩ.

In some implementations, to determine resistance values in the offset ACTC 220, an intercept delta is determined. As an illustrative example, the intercept delta may be determined by Δ=y$_2$−y$_1$=0.47V. In some implementations, a target offset voltage (TOV) may be determined based on the intercept delta and a ratio of the resistance values in the multiplication ACTC 215. For example, the TOV may be determined by $$TOV = \Delta * \frac{Rdiv + Rot}{Rot}$$

Using the above example values, TOV=1.56V. As an example, suppose Rx1=10 kΩ and a reference voltage set by a voltage regulator U4 is 1.24V. The value of Rx may be given by $$1.56 = 1.24 * \left(\frac{Rx}{10000} - 1\right)$$

In this case, Rx≈2.6 kΩ. In some examples, R$_{div}$ is connected to the output of U4. For example, a current limiting resistor (e.g., 150Ω) is added. Accordingly, mathematically matched PTCTC 200 to the TVCR is designed. For example, a simulation may be generated to verify the outputs of the PTCTC and target output values.

Figure 4A:
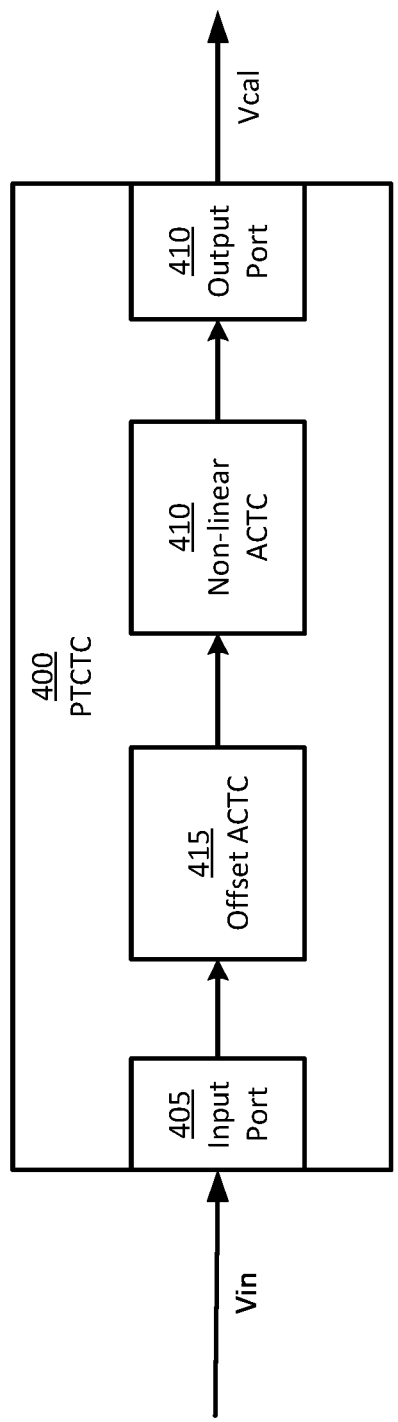
FIG. 4A is a block diagram showing an exemplary non-linear PTCTC.

FIG. 4A is a block diagram showing an exemplary non-linear PTCTC 400. For example, the PTCTC 400 may be used to translate a non-linear approximate function of the pre-existing TVTR. As shown, the PTCTC 400 includes an input port 405 and an output port 410. The input port 405 receives a temperature sensor output (Vin). Based on Vin, the PTCTC 400 generates a calibrated voltage (Vcal) at the output port 410.

In this example, the PTCTC 400 includes a non-linear ACTC 420 and an offset ACTC 415. For example, the non-linear ACTC 420 and the offset ACTC 415 may collectively match an approximate transfer function of the pre-existing TVTR. For example, the approximate function may be a non-linear function. For example, the non-linear function may include an inverse function. For example, the non-linear function may include a logarithmic function. For example, the non-linear function may include an exponential function. For example, the non-linear function may include a polynomial function. For example, the non-linear function may include a combination of various non-linear functions (e.g., including polynomial functions, logarithmic functions, and exponential functions). In some implementations, the pre-existing TVTR may be difficult to be approximated, within the predetermined temperature range of interest, by a linear function. For example, a linear approximation of the TVTR may generate out of margin errors within the predetermined temperature range of interest.

The offset ACTC 415, in some implementations, may offset the first function by a third predetermined CTF (e.g., a voltage offset) to generate an intermediate function, f$_{offset}$(T)=f$_1$(T)+offset. The non-linear ACTC 420, in some implementations, may apply a fourth CTF to the intermediate function. For example, based on the approximated transfer function, the fourth CTF may be inverting the intermediate function. For example, the third predetermined CTF may be determined by minimizing a root mean square of a difference between the intermediate function and the approximation function.

Accordingly, by combining the offset ACTC 415 and the non-linear ACTC 420, the PTCTC 400 may generate a calibrated transfer function to translate a temperature measurement into the calibrated function f$_{cal}$(T)=Vcal. In various examples, the calibrated function f$_{cal}$(T) may be substantially close to a highly non-linear TVTR.

Figure 4B:
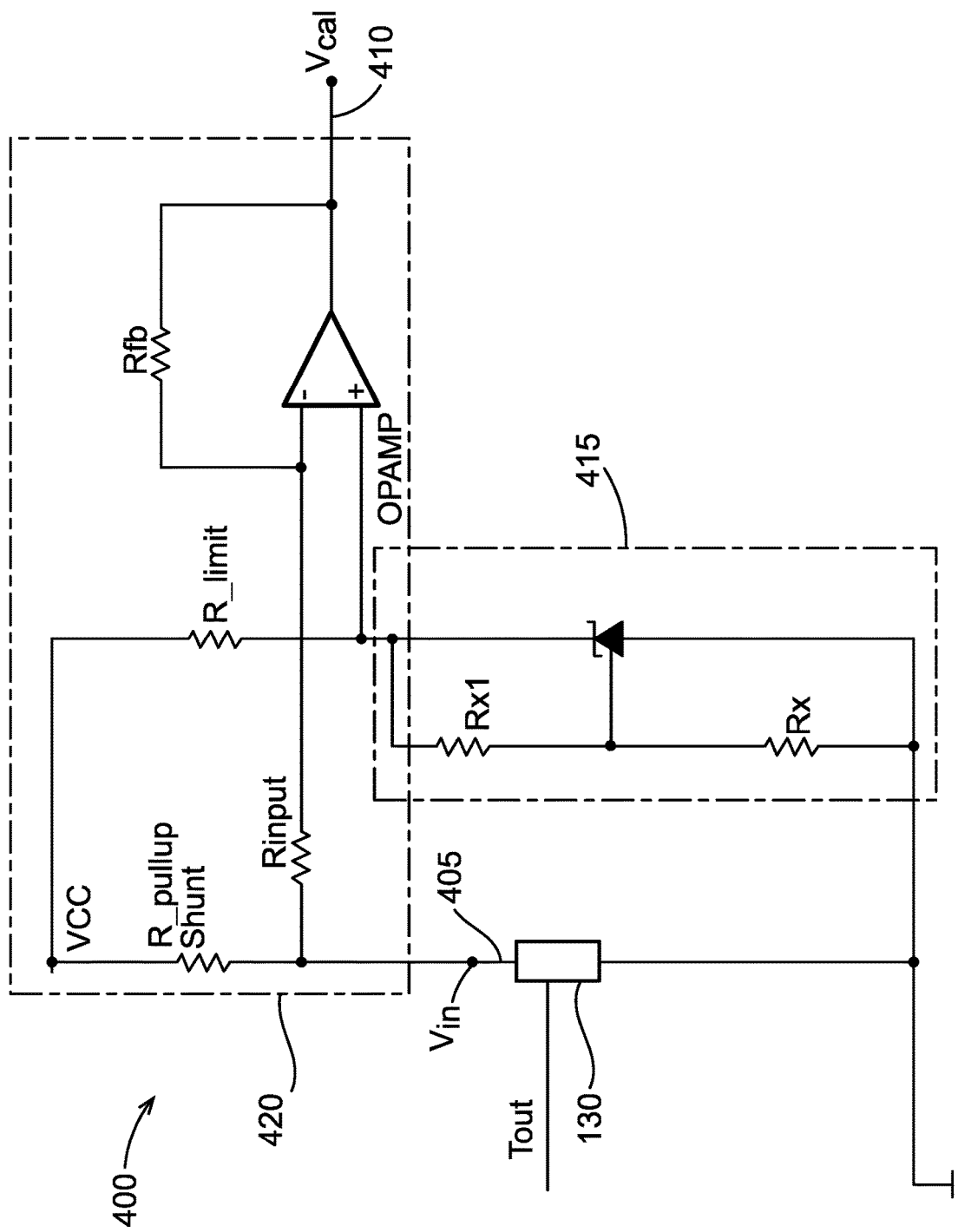
FIG. 4B depicts an exemplary electrical schematic of a second embodiment of the PTCTC as described with reference to FIG. 4A.

FIG. 4B depicts an exemplary electrical schematic of a second embodiment of the PTCTC 400 as described with reference to FIG. 4A. In this example, Vin is generated by the temperature sensor 130. In some implementations, the temperature sensor 130 may generate the Vin based on a measured temperature (Tout) based on a first transfer function 135a.

For example, collectively, the non-linear ACTC 420 and the offset ACTC 415 may generate Vcal based on a calibrated transfer function 135c that is substantially close to a predetermined TVTR. For example, the PTCTC 400 may invert the first transfer function 135a at a y-intercept of first transfer function 135a.

The non-linear ACTC 420, as shown, includes an inverting operational amplifier (opamp). In various implementations, other non-linear CTF may be applied based on simulation results. For example, when the simulation results show that an exponential CTF is more effective to match the approximated function, the exponential CTF may be applied. For example, when the simulation results show that a logarithmic CTF is more effective to match the approximated function, the logarithmic CTF may be applied.

In various implementations, the non-linear CTF may include a multi-order polynomial (e.g., a 5$^{th}$ order polynomial). For example, parameters of the polynomial may be generated by an impedance tracing simulation. The resistance values of various resistance and op-amp gain may be generated based on the impedance tracing simulation result. In various implementations, the PTCTC 400 may advantageously match Vcal with the pre-existing TVTR of a controller. Some exemplary results are shown with reference to FIG. 5.

Figure 4C:
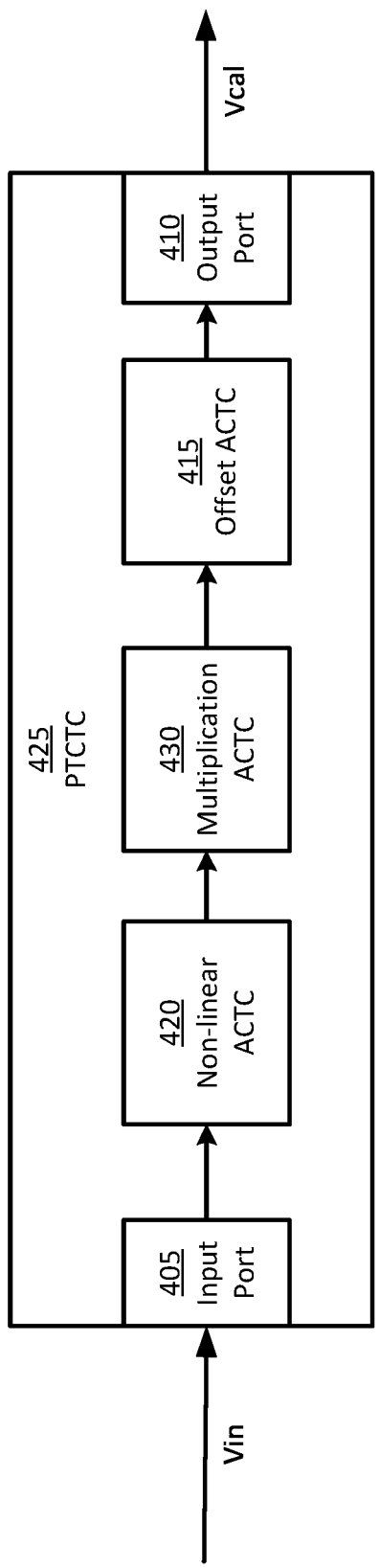
FIG. 4C shows an exemplary non-linear PTCTC in a second exemplary embodiment.

FIG. 4C shows an exemplary non-linear PTCTC in a second exemplary embodiment. In this example, a non-linear PTCTC 425 includes a multiplication ACTC 430. In this example, the multiplication ACTC 430 may scale an intermediate function from the non-linear ACTC 420. As shown, the non-linear ACTC 420 in this example is arranged before the offset ACTC 415. In various embodiments, in a non-linear circuit, different arrangements may yield the same calibration function by adjusting parameters within the ACTC. For example, arranging ACTCs in different topologies may advantageously reduce cost and/or space in implementing the PTCTC.

Figure 4D:
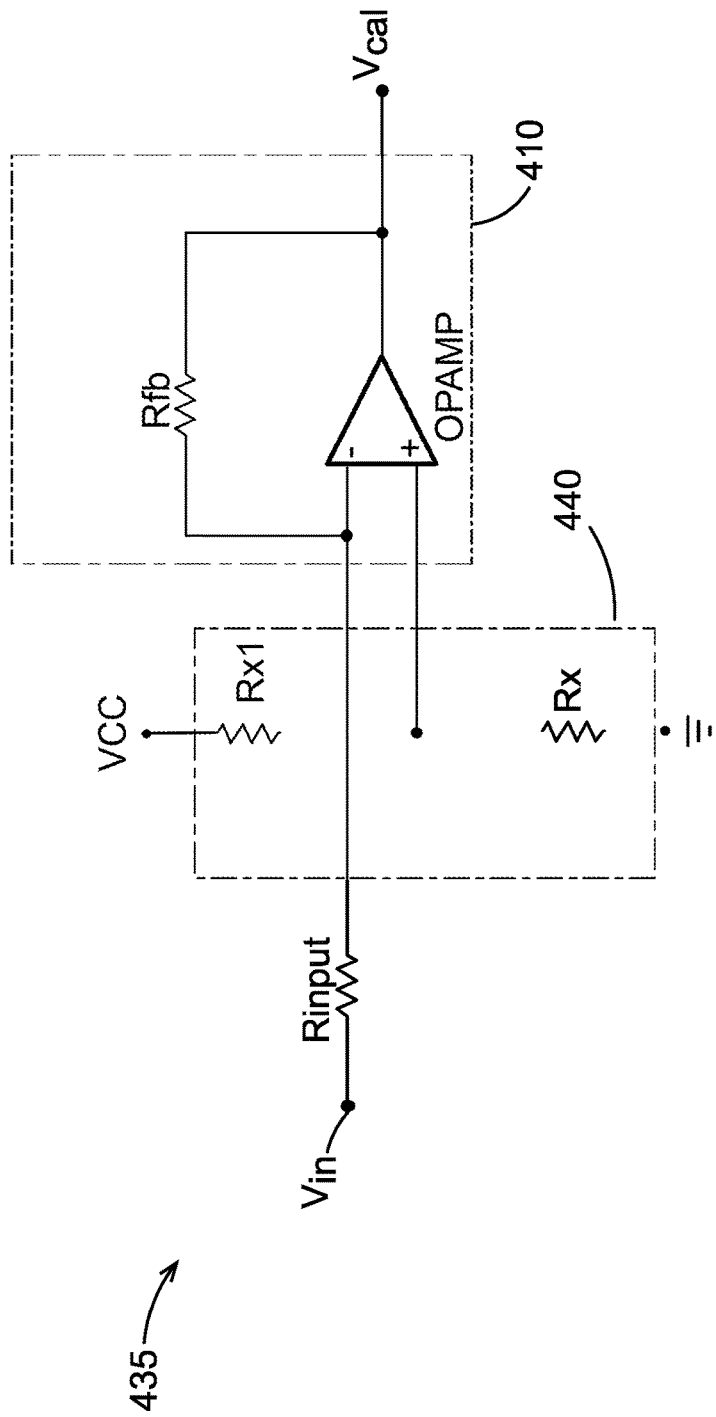
FIG. 4D depicts an exemplary electrical schematic of another embodiment of the PTCTC as described with reference to FIG. 4A.
Figure 5:
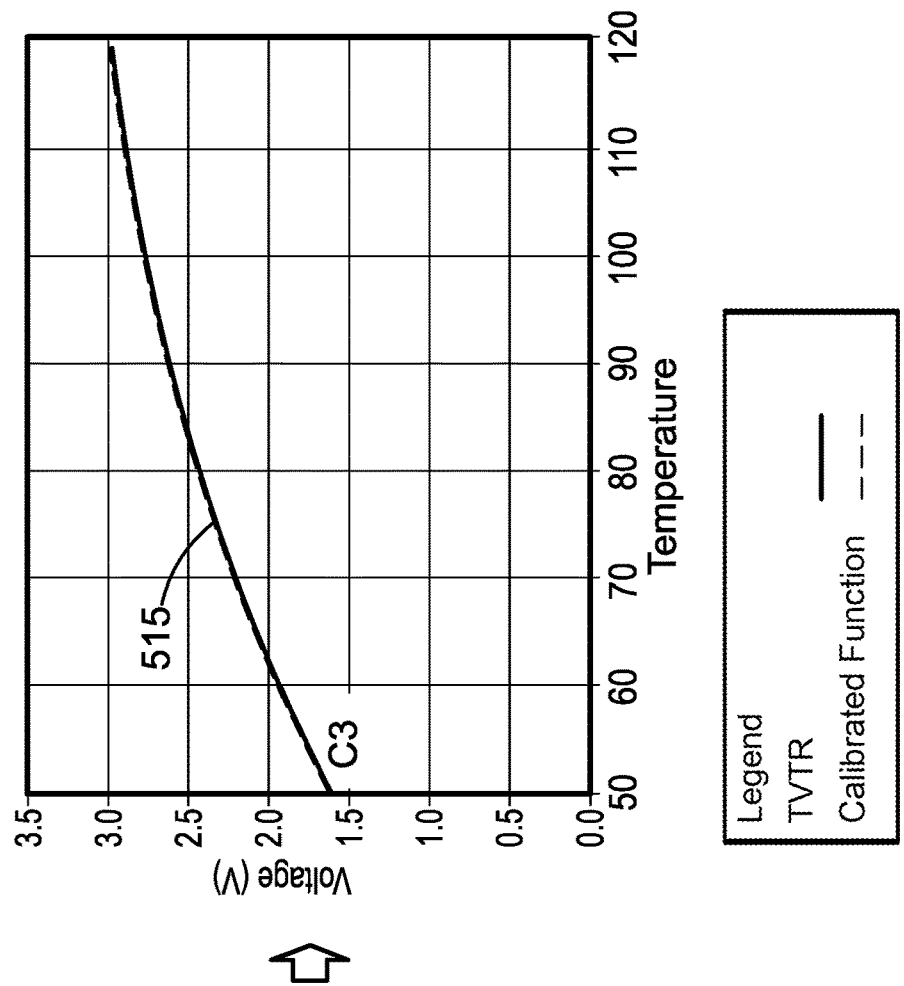
FIG. 5 depicts exemplary transfer responses of a voltage sensor and the voltage sensor coupled to the PTCTC described with reference to FIG. 4.
Figure 5:
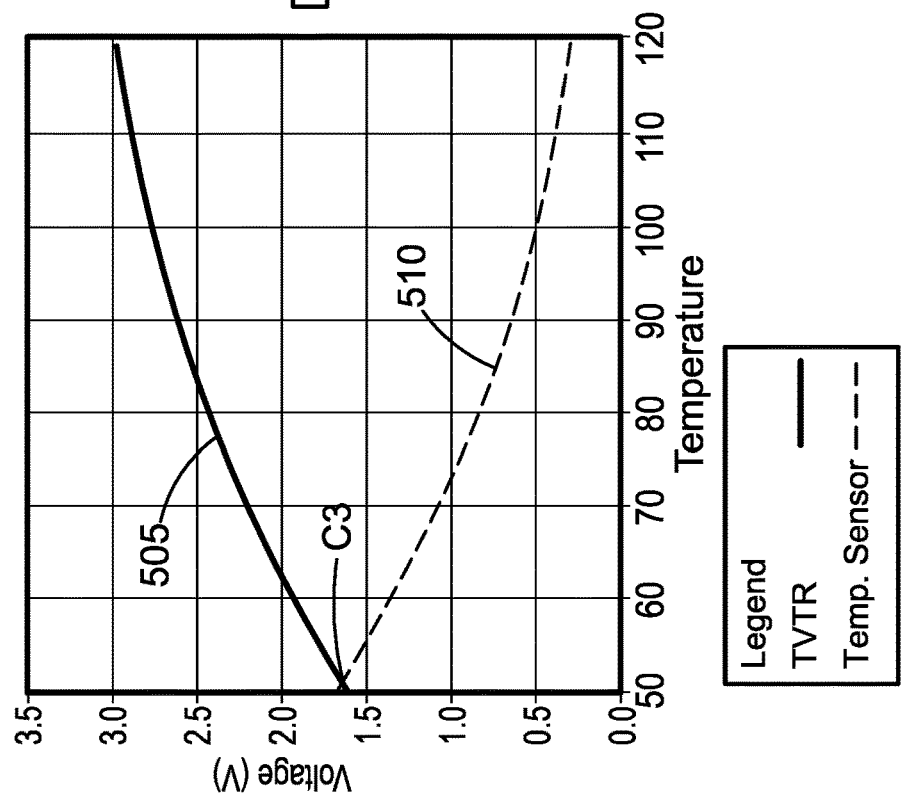

FIG. 4D depicts an exemplary electrical schematic of an alternative embodiment of the PTCTC 400 as described with reference to FIG. 4A. As shown, a second embodiment of an offset ACTC 440 is implemented. For example, the offset ACTC 440 may use less component. For example, the offset ACTC 440 may be more cost effective. FIG. 5 depicts exemplary transfer responses of a voltage sensor and the voltage sensor coupled to the PTCTC described with reference to FIG. 4. As shown, a TVTR response 505 may be an inverse function of a transfer function 510 of the temperature sensor 130. For example, the TVTR may be generated by a target NTC of a temperature sensor that was connected to VCC. For example, a NTC of the temperature sensor 130 may be internally connected to ground. As shown in this example, the PTCTC 400 may generate a calibrated function 515 that is substantially matching the TVTR response 505.

In some examples, to match the TVTR response 505 and the transfer function 510, opamp resistors are determined. For example, Rinput=Rfb. For example, Rinput>R_Pullup. For example, if R_Pullup=30 k$\Omega$, then Rinput=Rfb=100 k$\Omega$. Next, the PTCTC 400 may be analyzed with opamp ground referenced. For example, a reference temperature is selected. For example, $T_{ref}$=90° C. In some examples, suppose a target voltage at $T_{ref}$ is 2.632V and an offset voltage between the temperature sensor output and the target voltage is −0.629V. A delta voltage $V_{delta}$ is determined by $$V_{delta} = V_{target} - V_{offset} = 2.632 - (-0.629) \approx 3.26$$

Next, the PTCTC 400 is analyzed with the opamp at Vref referenced. For example, a crossover voltage is determined at a crossover temperature at an intersection of the two TVTR response 505 and transfer function 510. For example, Vcrossover=1.6497≈1.65. Comparing to $V_{delta}$*0.5=1.63, there may be an error due to non-linearity of the opamp.

Next, the resistors to generate the Vref are determined. For example, Voltage=1.65V. Then, $$Vout = 1.24 * \left(\frac{Rx}{Rx1} + 1\right)$$

As an illustrative example, select Rx1 =10 k$\Omega$. Rx≈3.3 k$\Omega$. In some implementations, Rx may be increased to increase Voffset. For example, a selection may be $R_x$=3.5 k$\Omega$.

For example, the PTCTC 400 with determined values maybe simulated to validate whether the Outputs are sufficiently matched. If it is sufficiently matched, then the process ends.

Figure 6:
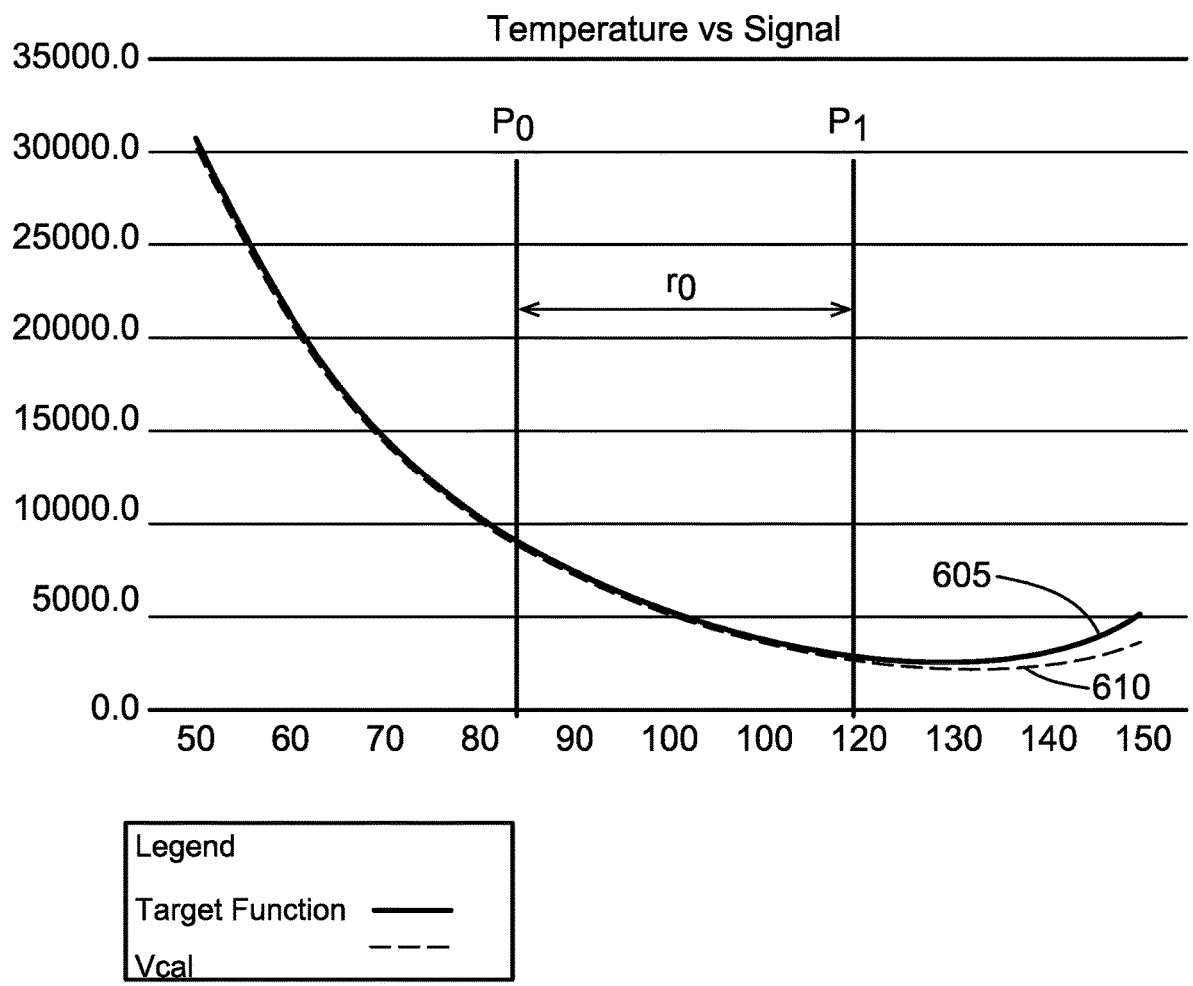
FIG. 6 depicts an exemplary non-linear transfer response of a PTCTC.

FIG. 6 depicts an exemplary non-linear transfer response of a PTCTC. In various implementations, a PTCTC may be configured to match a TVTR within an exemplary predetermined temperature range of interest (PTRI). For example, the TVTR may be highly non-linear that may require a complex (e.g., multi-staged polynomial ACTCs and electronics) to translate the first transfer function 135a into the calibrated transfer function 135c that matches the TVTR in a wide range of temperatures.

In some implementations, the PTCTC may be simplified by including only ACTCs for matching the TVTR within a range of temperature (r1). For example, r1 may be defined as a range between temperatures P0 and P1. In some implementations, P0 and P1 may be determined by operation characteristics of the IPM 120 and/or the motor 115. For example, P0 may be 85° C. For example, P1 may be 120° C. As shown, a target function 605 representing the TVTR may deviate from a calibrated function 610 at a temperature range outside of r1. But the target function 605 and the calibrated function 610 are substantially overlaid on each other within r1.

Figure 7:
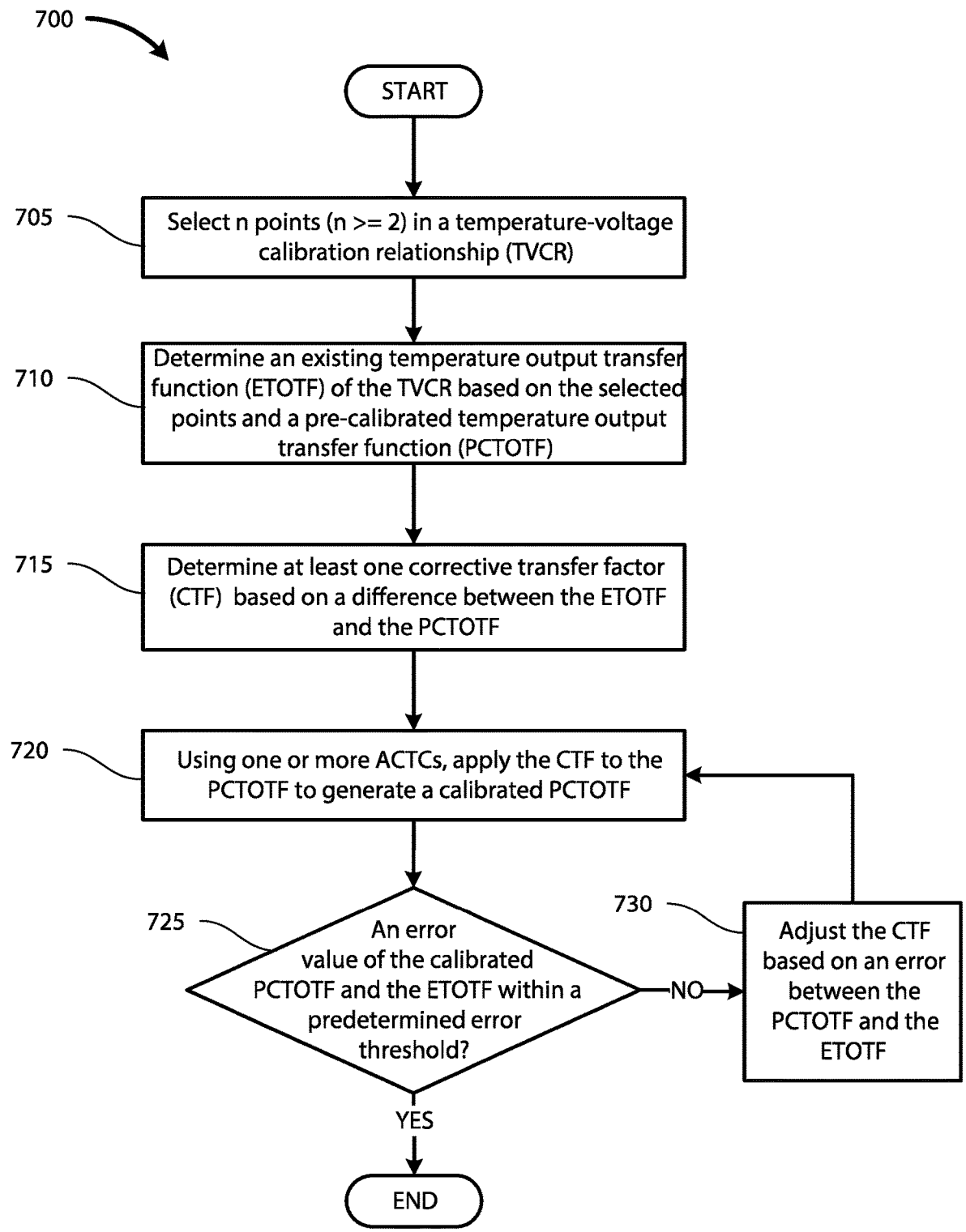
FIG. 7 is a flowchart illustrating an exemplary PTCTC configuration method.

FIG. 7 is a flowchart illustrating an exemplary PTCTC configuration method 700. For example, the method 700 may calibrate a temperature-based voltage output to a predetermined TVTR. For example, the method 700 may be performed when an IPM having a temperature sensor with a temperature voltage transfer function different from the temperature voltage translation rules 170 stored in the controller 125 is to be installed into the home appliance 105.

In this example, the method 700 begins when n points (n≥2) in a TVCR is selected in step 705. In some examples, the n points may be selected within a predetermined temperature range of interest. Next, in step 710, an existing temperature output transfer function (ETOTF) of the TVCR based on the selected points and a pre-calibrated temperature output transfer function (PCTOTF) is determined. For example, two points in the TVCR are selected to generate the (linear) second transfer function 135b. For example, multiple points in the TVCR are selected to generate an approximation of a (non-linear) second transfer function. For example, the ETOTF and the PCTOTF may be generated and stored in a simulation computer application.

In step 715, at least one calibration function is determined based on a difference between the ETOTF and the PCTOTF. For example, the difference may include a difference of voltages at multiple sampling points (temperature) of the ETOTF and the PCTOTF. For example, the difference may include a difference of slopes and y-intercepts of the ETOTF and the PCTOTF. Next, the calibration function is applied to the PCTOTF to generate a calibrated PCTOTF using one or more ACTCs in step 720. For example, the PCTOTF may be applied with a calibration function generated by a combination of one or more linear and/or non-linear ACTCs 180, 185, 190.

In a decision point 725, it is determined whether an error value of the calibrated PCTOTF and the ETOTF within a predetermined error threshold. For example, the error value may be determined by integrating a difference between the calibrated PCTOTF and the ETOTF over a predetermined PTRI. If the error value is not within a predetermined threshold, in step 730, the calibration function is adjusted based on the error between the PCTOTF and the ETOTF and the step 720 is repeated. If the error value is within the predetermined threshold, the method 700 ends.

Figure 8:
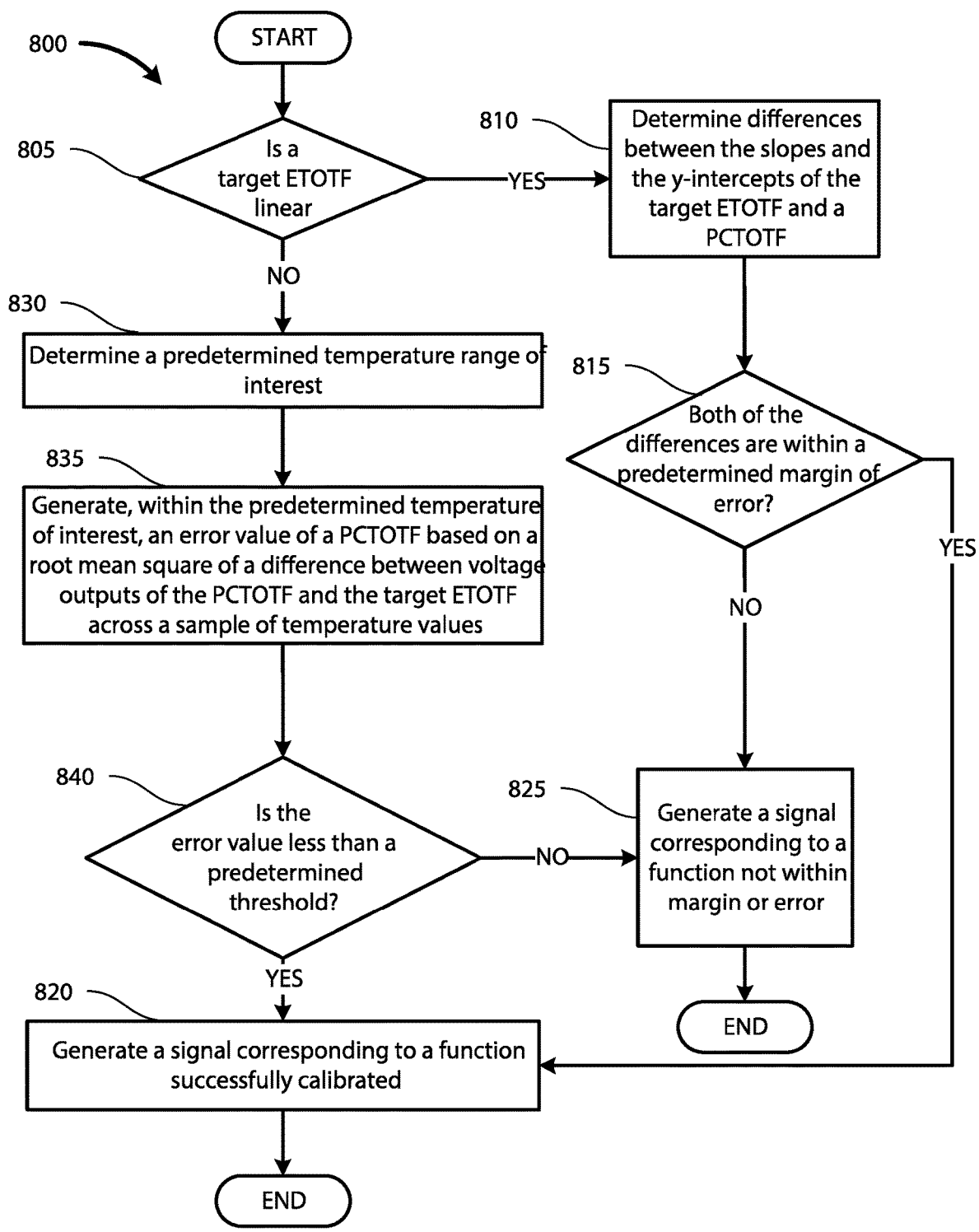
FIG. 8 is a flowchart illustrating an exemplary PTCTC verification method.

FIG. 8 is a flowchart illustrating an exemplary PTCTC verification method 800. For example, the method 800 may be performed when the decision point 725 (described with reference to FIG. 7) is performed. For example, the method 800 may be used to determine whether a PCTOTF is substantially overlaying a target ETOTF. The method 800 begins in a decision point 805 to determine whether a target ETOTF is linear. If the target ETOTF is linear, in step 810, differences between the slopes and the y-intercepts of the target ETOTF and a PCTOTF is determined. For example, the slopes and y-intercepts of the second transfer function 135b and the calibrated transfer function 135c are compared. In a decision point 815, it is determined whether both of the differences are within a predetermined margin of error. For example, a difference between the slopes and a maximum error between the y-intercepts are compared with a set of error thresholds. If both of the differences are within the predetermined margin of error, a signal corresponding to a function that is successfully calibrated is generated in step 820, and the method 800 ends. If both of the differences are within the predetermined margin of error, a signal corresponding to a function that is not successfully calibrated is generated in step 825, and the method 800 ends.

In the decision point 805, if the target ETOTF is non-linear, a predetermined temperature range of interest is determined in step 830. Next, in step 835, an error value of a PCTOTF is, within the predetermined temperature of interest, generated based on a root mean square of a difference between voltage outputs of a PCTOTF and the target ETOTF across a sample of temperature values. For example, a root mean square of voltage differences between output voltages from the calibrated function 610 and the target function 605 corresponding to a range of temperatures within r1 (as described in FIG. 6) are determined.

In a decision point 840, it is determined whether the error value is less than a predetermined threshold. For example, the root mean square of the differences is compared to a predetermined error threshold. If the error value is less than a predetermined threshold, the step 820 is repeated. If the error value is higher than a predetermined threshold, the step 825 is repeated.

Although various embodiments have been described with reference to the figures, other embodiments are possible.

Although an exemplary system for home appliances has been described with reference to FIGS. 1A-B, other implementations may be deployed in other industrial, scientific, medical, commercial, and/or residential applications. For example, the PTCTC 140 may be used to translate a temperature voltage transfer function of the IPM 120 to a predetermined TVCR of a control logic of a pick and transfer robotic arm. For example, the PTCTC 140 may be used to translate a temperature voltage transfer function of the IPM 120 to a predetermined TVCR of a control logic of a dental implant surgical brushless motor. For example, the PTCTC 140 may be used to translate a temperature voltage transfer function of the IPM 120 to a predetermined TVCR of a control logic of a pressure pump of a bench experiment reactor. For example, the PTCTC 140 may be used to translate a temperature voltage transfer function of the IPM 120 to a predetermined TVCR of a control logic of a commercial air condition unit of a high-rise building. For example, the PTCTC 140 may be used to translate a temperature voltage transfer function of the IPM 120 to a predetermined TVCR of a control logic of a dishwasher.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a temperature-voltage calibrated power module may include an intelligent power module (IPM) configured to control a power switching in a motor. For example, the temperature-voltage calibrated power module may include a post temperature calibration translation circuit (PTCTC) configured to receive measurement signals from the IPM.

For example, the PTCTC may include an output port operably coupled to a motor controller. For example, the motor controller may include a control logic configured to regulate a power input to a motor based on a first predetermined transfer function corresponding to a temperature signal translation relationship. The PTCTC may include an input port coupled to the intelligent power module (IPM).

For example, the IPM may include a temperature sensor configured to measure a temperature of the IPM to generate the measurement signals based on a second predetermined transfer function of a measured temperature. For example, the second predetermined transfer function may be different from the first predetermined transfer function.

The PTCTC may include a first analog corrective translation circuit (ACTC) configured to generate temperature input signals to the motor controller as a function of the measured temperature based on a third transfer function. For example, the third transfer function may include at least one corrective translation factor (CTF) and the second predetermined transfer function. For example, the at least one CTF may include an analog model to translate the measurement signals into the temperature input signals.

For example, the measurement signals may be translated into the temperature input signals in real-time by the first ACTC. For example, within a predetermined temperature range of interest, an error value corresponding to difference between an output of the first predetermined transfer function and an output of the third transfer function may be less than a predetermined error threshold, For example, when the second predetermined transfer function may be modified, the PTCTC may be adaptively configured may include a second ACTC based on the first predetermined transfer function and the modified second predetermined transfer function such that the control logic may be kept unchanged.

For example, the predetermined temperature range of interest may be between 85° C. and 120° C. For example, the at least one CTF may include a linear model. For example, the error value may include differences between y-intercepts of the first predetermined transfer function and the third transfer function, and differences between slopes of the first predetermined transfer function and the third transfer function.

For example, the at least one CTF may include an inverse function. For example, the ACTC may include a voltage divider circuit. For example, the ACTC may include a voltage offset circuit. For example, the ACTC may include an amplifier circuit. For example, the first predetermined transfer function may include an approximation of a predetermined temperature voltage translation relationship (TVTR).

In an illustrative example, a post temperature calibration translation circuit (PTCTC) may include an output port operably coupled to a motor controller. For example, the motor controller may include a control logic configured to regulate a power input to a motor based on a first predetermined transfer function corresponding to a temperature signal translation relationship.

For example, the PTCTC may include an input port coupled to a temperature sensor. For example, the temperature sensor may be configured to generate measurement signals corresponding to measured temperatures based on a second predetermined transfer function. For example, the second predetermined transfer function may be different from the first predetermined transfer function For example, the PTCTC may include a first analog corrective translation circuit (ACTC) configured to generate temperature input signals to the motor controller as a function of the measured temperature based on a third transfer function. For example, the third transfer function may include at least one corrective translation factor (CTF) and the second predetermined transfer function. For example, the at least one CTF may include an analog model to translate the measurement signals into the temperature input signals.

For example, the measurement signals may be translated into the temperature input signals in real-time by the first ACTC. For example, within a predetermined temperature range of interest, an error value corresponding to difference between an output of the first predetermined transfer function and an output of the third transfer function may be less than a predetermined error threshold. For example, when the second predetermined transfer function may be modified, the PTCTC may be adaptively configured may include a second ACTC based on the first predetermined transfer function and the modified second predetermined transfer function such that the control logic may be kept unchanged.

For example, the measurement signals may be generated as a function of a temperature measured within an intelligent power module configured to control a power switching in the motor. For example, the predetermined temperature range of interest may be between 85° C. and 120° C. For example, the error value may include a root mean square of the differences between the output of the first predetermined transfer function and the output of the third transfer function.

For example, the at least one CTF may include a linear model. For example, the error value may include differences between y-intercepts of the first predetermined transfer function and the third transfer function, and differences between slopes of the first predetermined transfer function and the third transfer function.

For example, the at least one CTF may include an inverse function. For example, the ACTC may include a voltage divider circuit. For example, the ACTC may include a voltage offset circuit. For example, the ACTC may include an amplifier circuit. For example, the first predetermined transfer function may include an approximation of a predetermined temperature voltage translation relationship (TVTR).

In an illustrative aspect, a calibration translation circuit configuration method may include selecting at least two points in a temperature voltage translation relationship (TVTR), For example, the TVTR may be a predetermined relationship configured in a controller logic. The calibration translation circuit configuration method may include determining an existing temperature output transfer function (ETOTF) of the TVTR based on the selected points. The calibration translation circuit configuration method may include determining a pre-calibrated temperature output transfer function (PCTOTF) based on at least a temperature-voltage characteristic of a temperature sensor The calibration translation circuit configuration method may include determining at least one corrective transfer factor (CTF) based on a difference between the ETOTF and the PCTOTF. For example, the calibration translation circuit configuration method may include applying the CTF to the PCTOTF to generate a corrected PCTOTF. The calibration translation circuit configuration method may include adjusting the CTF based on an error between the PCTOTF and the ETOTF. The calibration translation circuit configuration method may include implementing the at least one CTF in a post temperature calibration translation circuit having configured to receive input from an intelligent power module, and an output to a controller of a motor.

For example, within a predetermined temperature range of interest, an error value may include differences between the PCTOTF and the TVTR may be less than a predetermined error threshold. For example, the post temperature calibration translation circuit adaptively tracks the ETOTF of the TVTR when the temperature-voltage characteristic may be modified.

For example, the ETOTF may include a non-linear function. For example, the error value may include a root mean square of differences between voltage outputs of the PCTOTF and the TVTR across a sample of temperature values within the predetermined temperature range of interest.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A temperature-voltage calibrated power module comprising:
an intelligent power module (IPM) configured to control a power switching in a motor; and,
a post temperature calibration translation circuit (PTCTC) configured to receive measurement signals from the IPM, the PTCTC comprising:
an output port operably coupled to a motor controller, wherein the motor controller comprises a control logic configured to regulate a power input to a motor based on a first predetermined transfer function corresponding to a temperature signal translation relationship;
an input port coupled to the intelligent power module (IPM), wherein the IPM comprising a temperature sensor configured to measure a temperature of the IPM to generate the measurement signals based on a second predetermined transfer function of a measured temperature, wherein the second predetermined transfer function is different from the first predetermined transfer function; and, a first analog corrective translation circuit (ACTC) configured to generate temperature input signals to the motor controller as a function of the measured temperature based on a third transfer function, wherein the third transfer function comprising at least one corrective translation factor (CTF) and the second predetermined transfer function, wherein the at least one CTF comprises an analog model to translate the measurement signals into the temperature input signals, wherein:

the measurement signals are translated into the temperature input signals in real-time by the first ACTC, and, within a predetermined temperature range of interest, an error value corresponding to difference between an output of the first predetermined transfer function and an output of the third transfer function is less than a predetermined error threshold, wherein, when the second predetermined transfer function is modified, the PTCTC is adaptively configured comprising a second ACTC based on the first predetermined transfer function and the modified second predetermined transfer function such that the control logic is kept unchanged.

2. The temperature-voltage calibrated power module of claim 1, wherein the predetermined temperature range of interest is between 85° C. and 120° C.

3. The temperature-voltage calibrated power module of claim 1, wherein the at least one CTF comprises a linear model, wherein the error value comprises differences between y-intercepts of the first predetermined transfer function and the third transfer function, and differences between slopes of the first predetermined transfer function and the third transfer function.

4. The temperature-voltage calibrated power module of claim 1, wherein the at least one CTF comprises an inverse function.

5. The temperature-voltage calibrated power module of claim 1, wherein the ACTC comprises a voltage divider circuit.

6. The temperature-voltage calibrated power module of claim 1, wherein the ACTC comprises a voltage offset circuit.

7. The temperature-voltage calibrated power module of claim 1, wherein the ACTC comprises an amplifier circuit.

8. The temperature-voltage calibrated power module of claim 1, wherein the first predetermined transfer function comprises an approximation of a predetermined temperature voltage translation relationship (TVTR).

9. A post temperature calibration translation circuit (PTCTC), comprising:

an output port operably coupled to a motor controller, wherein the motor controller comprises a control logic configured to regulate a power input to a motor based on a first predetermined transfer function corresponding to a temperature signal translation relationship;

an input port coupled to a temperature sensor, wherein the temperature sensor is configured to generate measurement signals corresponding to measured temperatures based on a second predetermined transfer function, wherein the second predetermined transfer function is different from the first predetermined transfer function; and, a first analog corrective translation circuit (ACTC) configured to generate temperature input signals to the motor controller as a function of the measured temperature based on a third transfer function, wherein the third transfer function comprising at least one corrective translation factor (CTF) and the second predetermined transfer function, wherein the at least one CTF comprises an analog model to translate the measurement signals into the temperature input signals, wherein:

the measurement signals are translated into the temperature input signals in real-time by the first ACTC, and, within a predetermined temperature range of interest, an error value corresponding to difference between an output of the first predetermined transfer function and an output of the third transfer function is less than a predetermined error threshold, wherein, when the second predetermined transfer function is modified, the PTCTC is adaptively configured comprising a second ACTC based on the first predetermined transfer function and the modified second predetermined transfer function such that the control logic is kept unchanged.

10. The PTCTC of claim 9, wherein the measurement signals are generated as a function of a temperature measured within an intelligent power module configured to control a power switching in the motor.

11. The PTCTC of claim 9, wherein the predetermined temperature range of interest is between 85° C. and 120° C.

12. The PTCTC of claim 9, wherein the error value comprises a root mean square of the differences between the output of the first predetermined transfer function and the output of the third transfer function.

13. The PTCTC of claim 9, wherein the at least one CTF comprises a linear model, wherein the error value comprises differences between y-intercepts of the first predetermined transfer function and the third transfer function, and differences between slopes of the first predetermined transfer function and the third transfer function.

14. The PTCTC of claim 9, wherein the at least one CTF comprises an inverse function.

15. The PTCTC of claim 9, wherein the ACTC comprises a voltage divider circuit.

16. The PTCTC of claim 9, wherein the ACTC comprises a voltage offset circuit.

17. The PTCTC of claim 9, wherein the ACTC comprises an amplifier circuit.

18. The PTCTC of claim 9, wherein the first predetermined transfer function comprises an approximation of a predetermined temperature voltage translation relationship (TVTR).

19. A calibration translation circuit configuration method, comprising:

select at least two points in a temperature voltage translation relationship (TVTR), wherein the TVTR is a predetermined relationship configured in a controller logic;

determine an existing temperature output transfer function (ETOTF) of the TVTR based on the selected points;

determine a pre-calibrated temperature output transfer function (PCTOTF) based on at least a temperature-voltage characteristic of a temperature sensor;

determine at least one corrective transfer factor (CTF) based on a difference between the ETOTF and the PCTOTF;

apply the CTF to the PCTOTF to generate a corrected PCTOTF;

adjust the CTF based on an error between the PCTOTF and the ETOTF, and, implement the at least one CTF in a post temperature calibration translation circuit having configured to receive input from an intelligent power module, and an output to a controller of a motor, wherein, within a predetermined temperature range of interest, an error value comprising differences between the PCTOTF and the TVTR is less than a predetermined error threshold such that, the post temperature calibration translation circuit adaptively tracks the ETOTF of the TVTR when the temperature-voltage characteristic is modified.

20. The calibration translation circuit configuration method of claim 19, wherein:

the ETOTF comprises a non-linear function; and, the error value comprises a root mean square of differences between voltage outputs of the PCTOTF and the TVTR across a sample of temperature values within the predetermined temperature range of interest.

* * * * *